(12) United States Patent
Pyles

(10) Patent No.: US 11,922,539 B2
(45) Date of Patent: Mar. 5, 2024

(54) EXERCISE INSTRUCTION APPARATUS

(71) Applicant: Johnson Health Tech. Co., Ltd., Taichung (TW)

(72) Inventor: Nathan Pyles, Madison, WI (US)

(73) Assignee: Johnson Health Tech Co., Ltd., Taichung City (TW)

(*) Notice: Subject to any disclaimer, the term of this patent is extended or adjusted under 35 U.S.C. 154(b) by 241 days.

(21) Appl. No.: 17/561,984

(22) Filed: Dec. 26, 2021

(65) Prior Publication Data

US 2023/0206513 A1 Jun. 29, 2023

(51) Int. Cl.

| G06T 11/00 | (2006.01) |
| A63B 24/00 | (2006.01) |
| A63B 71/06 | (2006.01) |
| G06V 40/20 | (2022.01) |
| G09G 3/20 | (2006.01) |
| G09G 3/34 | (2006.01) |
| H04N 5/262 | (2006.01) |
| H04N 5/265 | (2006.01) |

(52) U.S. Cl.
CPC .......... *G06T 11/00* (2013.01); *A63B 24/0062* (2013.01); *A63B 71/0622* (2013.01); *G06V 40/23* (2022.01); *G09G 3/20* (2013.01); *G09G 3/3406* (2013.01); *H04N 5/2628* (2013.01); *H04N 5/265* (2013.01); *A63B 2024/0065* (2013.01); *A63B 2071/0638* (2013.01); *A63B 2071/0647* (2013.01); *A63B 2220/05* (2013.01); *A63B 2220/806* (2013.01); *A63B 2230/62* (2013.01); *G06T 2210/62* (2013.01); *G09G 2320/062* (2013.01); *G09G 2320/0626* (2013.01); *G09G 2320/0666* (2013.01); *G09G 2354/00* (2013.01); *G09G 2360/144* (2013.01)

(58) Field of Classification Search
None
See application file for complete search history.

(56) References Cited

U.S. PATENT DOCUMENTS

| 10,828,551 B2 | 11/2020 | Putnam |
| 11,465,030 B2 * | 10/2022 | Putnam .................. G06Q 50/01 |

* cited by examiner

*Primary Examiner* — Robert J Craddock

(57) ABSTRACT

An exercise instruction apparatus for guiding a user to perform a fitness exercise includes a control unit and a display device. The control unit is configured to control a video imagery displayed by the display device. The video imagery shows an instructor image and a user image simultaneously. The instructor image demonstrates movements of the fitness exercise and the user image presented in a mirror image is a real-time image of the user standing in front of the display device. The control unit is configured to adjust at least one image parameters such as brightness, transparency or contrast of at least one of the instructor image and the user image. The image parameter that is adjusted for the instructor image may be a different parameter than the image parameter that is adjusted for the user image. The instructor image may be overlapped on the user image, and the user can adjust the transparency of at least one of the first image and the second image.

17 Claims, 11 Drawing Sheets

| | Brighter ← (User)Ambient brightness → Darker | | |
|---|---|---|---|
| The brightness of images is not adjusted at all | User - Instructor<br>200 : 100 | User - Instructor<br>100 : 100 | User - Instructor<br>50 : 100 |
| The brightness of all images are adjusted by the same percent | User - Instructor<br>400 : 200 | User - Instructor<br>100 : 100 | User - Instructor<br>25 : 50 |
| The brightness of images are adjusted independently to create similar contrast levels | User - Instructor<br>220 : 220 | User - Instructor<br>100 : 100 | User - Instructor<br>45 : 45 |

FIG. 11

EXERCISE INSTRUCTION APPARATUS

BACKGROUND

1. Field of the Invention

The present invention relates to an exercise apparatus. More particularly, the present invention relates to an exercise instruction apparatus which guides a user to perform fitness exercises by images.

2. Description of the Related Art

U.S. Pat. No. 10,828,551 discloses an interactive exercise apparatus for using an image to guide a user to perform a fitness exercise. The interactive exercise apparatus (also referred to a "smart mirror") installs a liquid crystal display on the rear surface of a half-mirror, so that a user opposite the half-mirror can see a mirror image of himself or herself and a video imagery shown by the liquid crystal display. When the interactive exercise apparatus guides the user to perform a fitness exercise, the user can see the mirror image and follow the exercise demonstration performed by an instructor (e.g. coach) in the video imagery, so that the user can correct their motion or posture immediately. In the viewpoint of the user, the video imagery is overlapped on the mirror image in a semi-transparent manner, and the instructor image and the mirror image are usually located in the central area of the half-mirror.

In general, when the user is using the interactive exercise apparatus to perform fitness exercises, the contrast relationship of visibility between the video imagery and the mirror image is maintained in balance, so that the user can see the overlapped video imagery and mirror image at the same time. However, the contrast relationship will change according to the ambient light condition. When the ambient brightness is too bright or too dark, the contrast relationship may be out of balance and affect the visual experience. For example, when the ambient brightness becomes higher (such as a room exposed to direct sunlight), the mirror image is as bright as the real ambient brightness because the half-mirror reflects the light in front of it, so that the visibility of the mirror image is significantly higher than the visibility of the video imagery, resulting in the user not being able to see the content of the video imagery well. In contrast, when the ambient brightness becomes darker (such as a dimly lit or dark room), the brightness of the video imagery shown by the liquid crystal display is relatively higher because the user's pupils will become naturally dilated in the darker room, and the mirror image reflected by the mirror is as dark as the real ambient brightness, so that the visibility of the video imagery is significantly higher than the visibility of the mirror image, resulting in the user not being able to see the mirror image well. Of course, even if the ambient brightness is not very bright or very dark, the changing of the ambient brightness will also cause the visibility of the video imagery and the mirror image to change accordingly, adversely affecting the visual experience.

An automatic adjustment method commonly available in smart phones or tablet computers may be directly used on the interactive exercise apparatus, so there is an ambient light sensor to detect and automatically adjust the video imagery brightness according to the ambient brightness (for example, adjust the luminance of the backlight module of the display device). In this way, the brightness of the screen can be matched with the ambient brightness to improve the visibility of the video imagery in a brighter ambient condition, and to reduce eyestrain in a darker ambient condition. However, the problem mentioned above cannot be solved in exactly the same way because the smart phones or tablet computers only consider an impact of the screen brightness to the user. The interactive exercise apparatus adjusts the brightness of the screen to change the visibility of the video imagery, but it can't change the visibility of the mirror image formed by the ambient light on the front side of the mirror. In other words, the user can see the video imagery well under various ambient brightness, but that doesn't guarantee that the user can also see the mirror image well, and the contrast relationship of visibility between the video imagery and the mirror image can't be maintained in a close balance.

Another disadvantage of the interactive exercise apparatus is that the user may want to see the instructor image alone and not want to see the mirror's reflective image of the user. Based on different user needs, or conversely, the user may want to see the mirror image alone and not want to see the instructor image, instead allowing the user follow an instructor voice to perform the fitness exercise. A conventional exercise apparatus can't meet the user's needs and wants, and creating a dim indoor environment and/or increasing the screen brightness to fade the mirror image or creating a bright indoor environment and/or decreasing the screen brightness to fade the video imagery does not overcome this disadvantage.

SUMMARY

The present invention provides an exercise instruction apparatus that allow a user to simultaneously see an instruction image for demonstrating the fitness exercise and a user image of a real-time reflection of the user, so that the user can follow the demonstration and correct his or her posture. The exercise instruction apparatus lets the user simultaneously see the overlapped instructor image and the user image well, and a contrast relation of the visibility between the instructor image and the user image will not change when the ambient brightness changes.

It is another object of the present invention to provide an exercise instruction apparatus that allow a user to simultaneously see an instruction image for demonstrating the fitness exercise and a user image of a real-time reflection of the user. The user can adjust a contrast relation of the visibility between the instructor image and the user image to correct the contrast imbalance caused by the ambient brightness.

The user can adjust the contrast relation of the visibility between the instructor image and the user image to correct the contrast imbalance caused by the ambient brightness. Alternatively, the user can deliberately adjust the imbalance contrast relation so that the user can focus on the relatively eye-catching image (either the displayed image or the reflected image), or preferably, one of the two images can be adjusted to be completely transparent so that the other image can be seen alone.

The present invention provides an exercise instruction apparatus that includes an instruction data acquiring device that is configured to acquire an instructor image for demonstrating movements of the fitness exercise, a display device configured to display video imagery on a screen, a capture device configured to capture a real-time image of the user in front of the display device, and a control unit electrically connected to the instruction data acquiring device, the display device and the capture device. The control unit is configured to receive corresponding data of the instructor image obtained by the instruction data acquiring device and to control content of the video imagery displayed by the display device, the control unit controls the instructor image shown in the video imagery when guiding the user to perform the fitness excise for allowing the user opposite the screen of the display device to follow the demonstrated movements of the fitness exercise. The control unit is configured to receive corresponding data of the real-time image captured by the capture device. When guiding the user to perform the fitness excise, the control unit controls the video imagery to show a first image and a second image simultaneously. The first image comprises the instructor image and the second image comprises a user image from the real-time image captured by the capture device, where the real-time image is presented as a mirror image of the user. The control unit preforms corresponding image processing on the content of the video imagery based upon the ambient brightness around the exercise instruction apparatus, and the image processing includes adjusting at least one image parameter of at least one of the first image and the second image. The image parameter that is adjusted for the first image may be a different parameter than the image parameter that is adjusted for the second image.

Preferably, the image parameter includes at least one of following parameters: brightness, transparency, contrast, sharpness, hue, luminance, chroma, gain, gamma, color temperature and color balance.

Preferably, the control unit controls position and size of the user image whereby the user seeing the user image is similar to seeing the mirror image of the user through the mirror.

Preferably, the exercise instruction apparatus includes a command receiving interface for receiving a command from the user, and the control unit is electrically connected to the command receiving interface to allow the exercise instruction apparatus to respond to the user command to respectively adjust the image parameter, position or size of at least one of the first image and the second image.

Preferably, the first image and the second image at least partially overlap, and an overlapped part shows the first image and the second image at the same time in a semi-transparent manner.

Preferably, the exercise instruction apparatus includes a command receiving interface for receiving a command from the user, and the control unit is electrically connected to the command receiving interface to allow the exercise instruction apparatus to respond to the user command to adjust transparency of at least one of the first image and the second image.

Preferably, the transparency of the first image and the second image are adjustable in at least five stages from completely transparent to completely opaque, and a decrease in the transparency of one of the first image and the second image occurs in conjunction with an increase in the transparency of the other, whereby when one of the first image and the second image is completely opaque, the other is completely transparent.

Preferably, the exercise instruction apparatus includes a speaker device, and the control unit is operable to control a voice content emitted by the speaker device to include an instructor voice corresponding to the instructor image.

Preferably, when the ambient brightness around exercise instruction apparatus becomes brighter, the control unit performs the image processing of decreasing the transparency of the first image and increasing the transparency of the second image, and when the ambient brightness around the exercise instruction apparatus becomes darker, the control unit performs the image processing of increasing the transparency of the first image and decreasing the transparency of the second image.

Preferably, when the ambient brightness around the exercise instruction apparatus becomes brighter, the control unit performs the image processing of increasing brightness of at least the first image, and an increase in the brightness of the first image is greater than an increase in the brightness of the second image; and wherein when the ambient brightness around the exercise instruction apparatus becomes darker, the control unit performs the image processing of decreasing the brightness of at least the first image, and a decrease in the brightness of the first image is greater than the decrease in the brightness of second image.

Preferably, the exercise instruction apparatus includes an ambient light detector to detect an illuminance of an environment, the control unit is electrically connected to the ambient light detector for receiving a corresponding illuminance signal from the ambient light detector, and the control unit is configured to determine the ambient brightness around the exercise instruction apparatus according to the illuminance.

Preferably, the control device determines the ambient brightness around the exercise instruction apparatus according to brightness of the real-time image.

Further benefits and advantages of the present invention will become apparent after a careful reading of the detailed description with appropriate reference to the accompanying drawings.

BRIEF DESCRIPTION OF THE DRAWINGS

FIG. 11 illustrates a difference of image processing according to the ambient brightness between the present invention and other methods.

DETAIL DESCRIPTION

Figure 1:
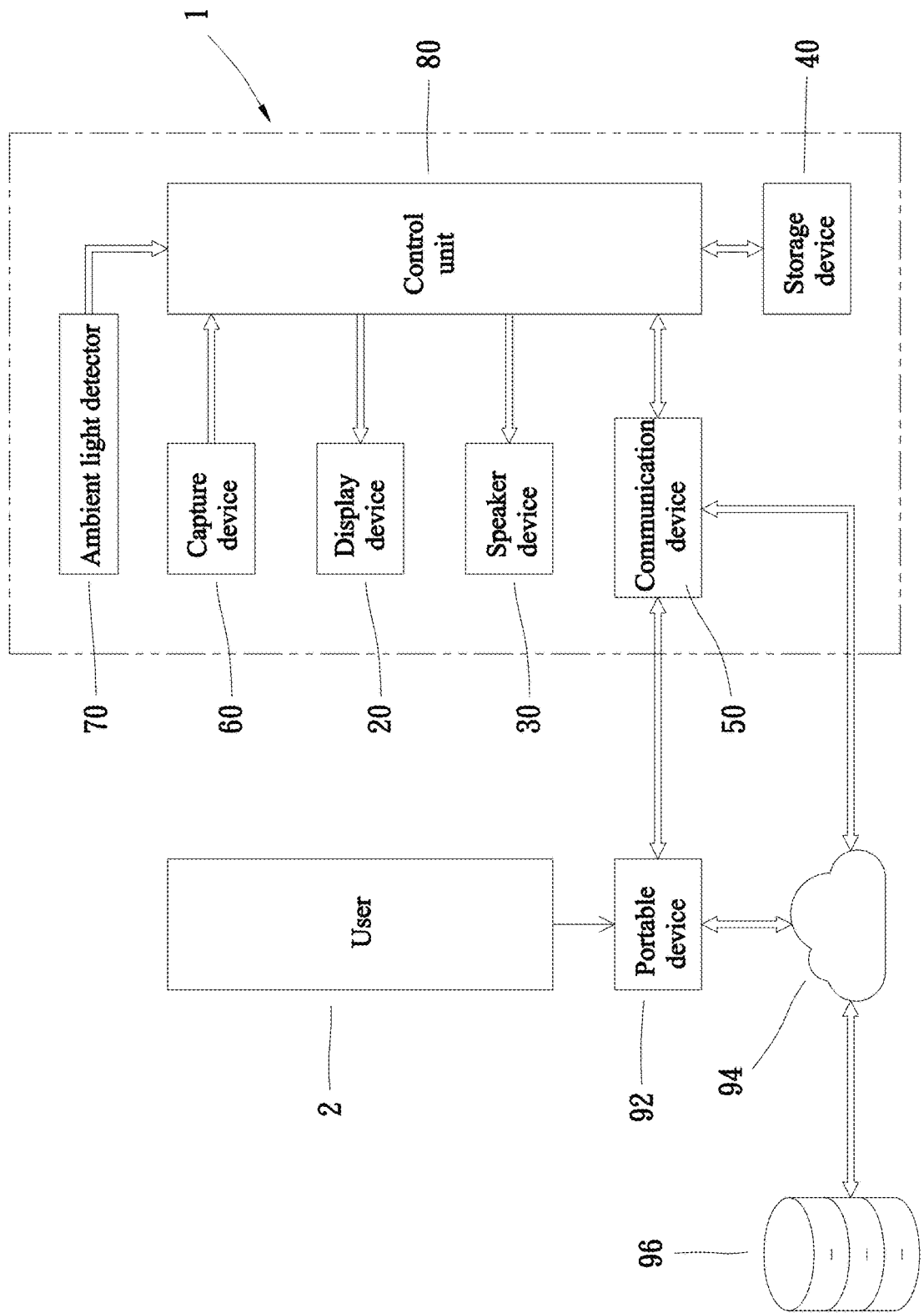
FIG. 1 is a block diagram illustrating an exercise instruction apparatus and associated peripheral apparatus of the preferred embodiment of the present invention.

Referring to FIG. 1, the right part of FIG. 1 shows schematically the main components of the exercise instruction apparatus 1 according to a preferred embodiment of the present invention, and the left part of FIG. 1 shows schematically a user 2 using the exercise instruction apparatus 1. FIG. 1. also shows a connection relationship between the exercise instruction apparatus 1 and related external devices, wherein the transmission direction of data, signals or commands are represented by arrows in FIG. 1. The exercise instruction apparatus 1 includes a display device 20 for displaying images, a speaker device 30 for emitting sound, a storage device 40 for storing data, a communication device 50 for bidirectional communication between external devices and the exercise instruction apparatus 1, a capture device 60 for capturing real-time image, a ambient light detector 70 for detecting an illuminance of an environment, and a control unit 80 for controlling all the devices mentioned above.

The control unit 80 is similar to a central processing unit (CPU) of a computer. It is electrically connected to the display device 20, speaker device 30, storage device 40, communication device 50, capture device 60 and ambient light detector 70 respectively (the connection is usually a wired connection, but wireless connection is possible). The control unit 80 controls the devices through electrical signal, and/or transmits or receives data and signal to or from these devices. In the present invention, the main task of the control unit 80 is to perform real-time digital image processing on the image displayed by the display device 20, so the control unit 80 may include a graphics processing unit or a graphics processing core, and a video RAM system.

Figure 2:
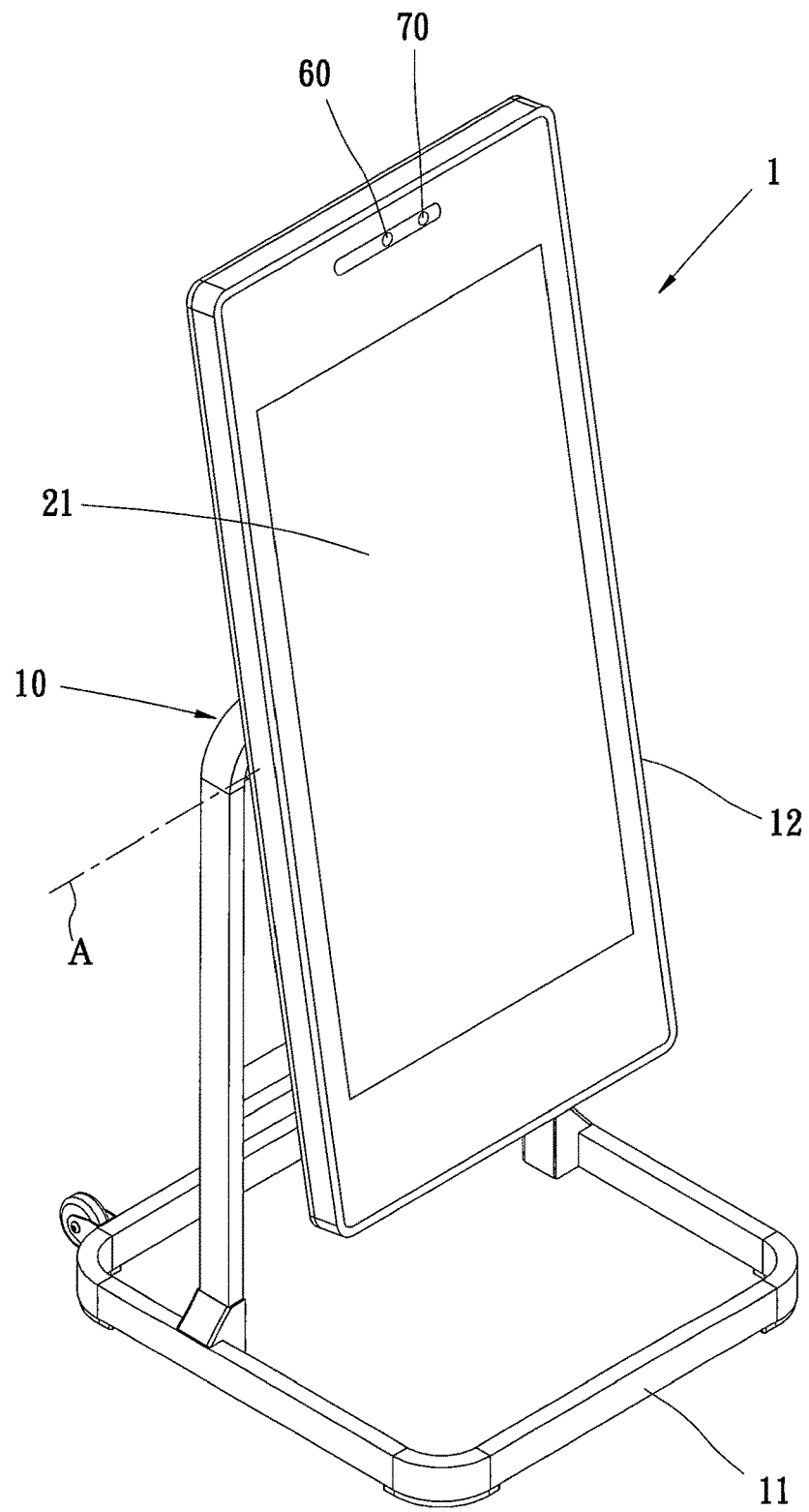
FIG. 2 is an external perspective view illustrating the exercise instruction apparatus of the preferred embodiment of the present invention.

As shown in FIG. 1 and FIG. 2, in the preferred embodiment of the present invention, the exercise instruction apparatus 1 includes a frame 10 as the device framework and shell, the frame 10 is comprised of a basic frame 11 and a movable frame 12. The frame 10 may stand on the ground (e.g. floor), the movable frame 12 is a portion of the frame 10 which is pivotally connected to the base frame body 11 and rotates around a rotation axis A in a predetermined range of angles. A positioning mechanism (not shown) is installed between the movable frame 12 and the base frame body 11 to determine whether the movable frame 12 can rotate, and the user may set the movable frame 12 at a desired angle by operating the positioning mechanism. For example, the positioning mechanism can keep the movable frame 12 vertical to the ground or tilted backward at a predetermined angle. The structure and operation of the positioning mechanism is for adjusting an angle of the movable frame 12. The functionality of pivoting the movable frame 12 relative to the basic frame 11 is described in more detail elsewhere, so it will not be introduced in detail here. Please refer to the applicant's Chinese utility model patent named "motion guiding device" for more detail of the positioning mechanism (Application Number: 202121730156.7).

Figure 3:
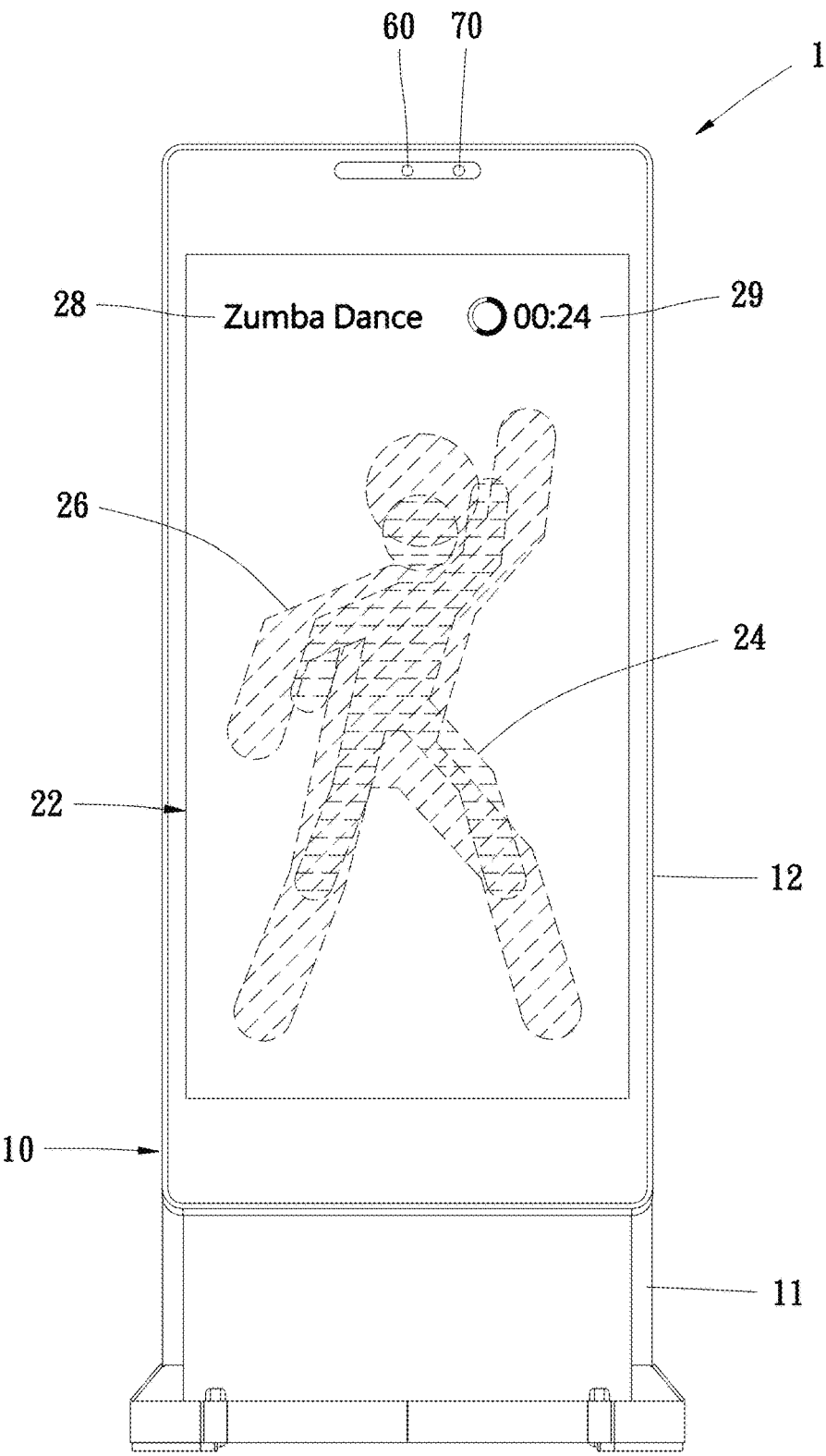
FIG. 3 is a front view of the exercise instruction apparatus in use and illustrates an example of displayed content.

The display device 20, the speaker device 30, the storage device 40, the communication device 50, the capture device 60, the ambient light detector 70, and the control unit 80 are installed on the movable frame 12. The configuration and function of each device are descripted in sequence as below:

The display device 20 is a flat panel display (e.g. a liquid crystal display, a plasma display, an organic light emitting diode display), and is installed in the inner space of the movable frame 12. A screen 21 is exposed at the center of the front of the movable frame 12. The screen 21 has a large size viewing area (e.g., a widescreen or an ultrawide screen with a diagonal measurement of about 43 inches or more) and set upright. The length of the screen is significantly larger than the width, and the width is preferentially wider than 50 cm. The display device 20 (flat panel display) has a high-definition (HD) or even ultra-high-definition (Ultra HD), which can display detailed and smooth images. The control unit 80 can control a content of video imagery 22 displayed by the screen 21 (as shown in FIG. 3). The controlling is similar to a computer host controlling content displayed by a computer screen. In order for the user standing in front of the screen 21 to see the video imagery 22 well, the screen 21 has a transparent plastic layer or glass layer with very little reflectivity to avoid a mirror effect, thereby minimizing or eliminating any mirror image reflection. The surface of the flat panel display has an anti-reflective effect generally. For example, the surface may be attached to a matte plastic layer for causing a diffuse reflection or it may utilize a glass layer with anti-reflection coating to reduce the impact of light reflection on the viewing image.

In other possible embodiments of the present invention (not shown), the display device is a projector or a TV which can project a video imagery on a wall surface, projection surface, or a vertical surface for the user standing in front of the display surface to see.

The speaker device 30 is installed in the bottom, both sides or other suitable place of the inner space of the movable frame 12, so that a voice or other sounds can be emitted to the outside through the speaker. The control unit 80 can control the content and the volume of the voice or other sounds emitted by the speaker device 30, which is similar to a computer host controlling a voice emitted by an external speaker.

The storage device 40 may be a random access memory (RAM), hard disk drive, solid state drive, rewritable compact disc, memory card, USB flash drive or a combination of other types of computer data storage. The control unit 80 can read data stored in the storage device 40 and write data into the storage device 40. The control unit 80 may comprise a main storage and a register, but the storage device 40 is mainly used as a mass storage. The present invention focuses on accessing instructor data for guiding users to perform fitness exercises, such as multimedia content and related data of various exercise courses.

The communication device 50 may be a Bluetooth module, a WiFi module, and/or an Ethernet network module, or it could utilize a different method of communication altogether. The control unit 80 performs bidirectional communication with the external devices via the communication device 50. The control unit 80 can connect to portable devices 92 (e.g., smart phones, smart watches, tablet computers, notebooks) of the user 2 and an external computer network 94 (e.g., local area network, wide area network, internet). The control unit 80 transmits data or commands to a portable devices 92 of the user 2, downloads data from local or remote database 96 and uploads data to the remote database 96. Furthermore, the exercise instruction apparatus can also remote connect to other exercise instruction apparatus via internet connection.

The user 2 can use the portable devices 92 to issue various commands to the exercise instruction apparatus 1 via the communication device 50. As an example, when the user select an exercise class, the control unit 80 may send a menu to the portable devices 92 via the communication device 50, or the portable devices 92 downloads a synchronized menu from the database 96 via the external computer network 94, so that the user 2 can select an exercise class from a specific application and transmit a corresponding command to the control unit 80 via the communication device 50. The communication device 50 is also a command receiving interface of the exercise instruction apparatus 1 for receiving commands from the user 2 and passing commands to the control unit 80. In other embodiments (not shown), the exercise instruction apparatus 1 may comprise a control dashboard, touch panel, speech recognition system or gesture recognition system as a command receiving interface for allowing the user to issue a command by pressing buttons, touching, voice control or gesture control, etc.

Some of the specific technology of control and communication between the control unit 80 and other device may not belong to the present invention, and some relevant technology can be applied or combined or added to existing technology and technology described herein. The transmission direction of data, signals or commands are represented by arrows in FIG. 1, but this schematic diagram is informational only and should not be read to imply any limitations on the functioning of the disclosed technology.

In the preferred embodiment of the present invention, an instruction data acquiring device of the exercise instruction apparatus 1 comprises a communication device 50 and/or a storage device 40 for acquiring instruction data to guide the user 2 to perform a fitness exercise, and the instruction data includes an instructor image for demonstrating movements of the fitness exercise, and an instructor voice corresponding to the instructor image. The control unit 80 receives the instruction data from the instruction data acquiring device, and the instruction data includes the instructor image and the instructor voice. For example, the control unit 80 acquires the instruction data via the communication device 50 from external devices (e.g., the database 96 or the portable device 92 of the user 2), and/or gets the instruction data from the storage device 40.

The capture device 60 is preferentially installed on the top of the movable frame 12, and it is controlled by the control unit 80 to continuously capture a high quality and high frame rate real-time images in front of the exercise instruction device 1, ideally with an image resolution of 1080p to 4K and with a frame rate of 60 fps or higher. Based on a suitable configuration of shooting angle and focal length, the user stands in front of the screen 21 at a predetermined distance (e.g., 2 or 3 meters) for best capture of the real-time images. Preferably, the pitch angle of the lens of the capture device 60 is adjustable to capture the user in various situations (e.g., the movable frame 12 in different angles, user height, user position, distance from the capture device 60, the height of various body parts, etc.). The present invention may also adapt to project an image on a wall (as a display surface), and the capture device may also be configured to record the image of the user standing in front of the display surface. The control unit 80 receives corresponding data of real-time image captured by the capture device 60 in real-time. In addition to using the real-time images as part of displayed image content, the control unit 80 may use image recognition technology to identify a position, posture, motion and specific gesture to issue a command.

The ambient light detector 70 is installed on the top of the movable frame 12 and detects the illuminance around the exercise instruction apparatus 1, where it detects the intensity of light shining in front of the movable frame 12. The control unit 80 receives corresponding data of the illuminance detected by the ambient light detector 70 and determines the ambient brightness around the exercise instruction apparatus 1 according to the illuminance.

Figure 4:
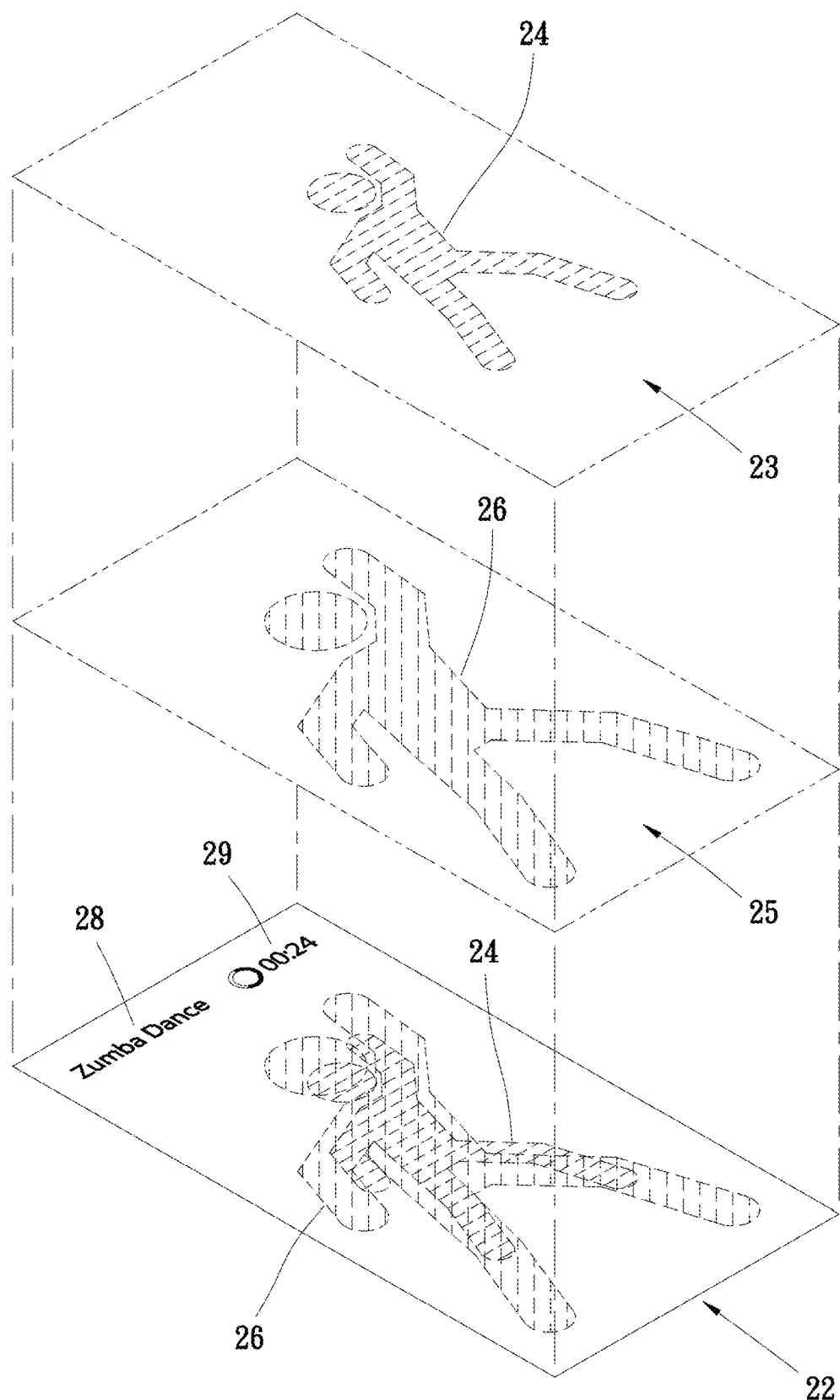
FIG. 4 illustrates an example displayed content of FIG. 3 including an overlapping of a first image and a second image.

The above is the basic structure of the exercise instruction device 1 of the preferred embodiment of the present invention, and the operation of the exercise instruction device 1 is described below. According to the usage status and progress of the exercise instruction device 1, the video imagery 22 displayed by the display device 20 may include various content, for example, a boot screen, a standby screen, a screen of user selecting exercise class, a screen for guiding a user to perform an exercise, and a screen for presenting the exercise results, etc. FIG. 3 shows a front view of the exercise instruction apparatus 1 and an exemplary screen for the content of the video imagery 22. FIG. 4 shows a layer structure of the video imagery 22. Referring to FIG. 3 and FIG. 4, the control unit 80 controls the video imagery 22 to show a first image 23 and a second image 25 simultaneously when the exercise instruction device 1 guides the user to perform the fitness excise. The first image 23 and the second image 25 are at least partially overlapped and the overlapped part shows the first image 23 and the second image 25 at the same time in a semi-transparent manner. Taking the color principle of "subtractive color mixing" as an example for explaining the semi-transparent overlapped image, assuming the first image 23 is yellow and the second image 25 is cyan, the overlapped part of two images is green, and when the transparency of the first image 23 is higher than second image 25 to 50% (in other word, the opacity is less than 50%), the overlapped part of these two images is green but slightly more cyan. In contrast, when the transparency of the first image 23 is less than the second image 25 to 50% (in other word, the opacity is higher than 50%), the overlapped part of these two images is green but slight more yellow. Existing technologies of semi-transparent overlapped images include alpha compositing, screen-door transparency and rapid alternation, etc. The "transparency" does not mean that the transparency or opacity of the image is exactly equal to 50%, and in the field of digital image processing, the value region of the transparency or opacity of the image is 0 to 1, which means that the state between completely opaque and completely transparent (invisible) may be called "transparency".

The first image 23 includes an instructor image 24 for dynamically demonstrating the movements of the fitness exercise for the user to follow. The instructor image may be an image of a real person in a pre-recorded video or an image of a real person (coach) in live-stream format, or it may be a computer animation of a humanoid character pre-produced or calculated in real-time using computer-generated imagery technology. The corresponding data of the instructor image 24 may be stored in the storage device 40 or from an external device, such as a local or remote database 96, and wherein the corresponding data sent to the exercise instruction apparatus 1 is streamed to the exercise instruction apparatus 1. The control unit 80 acquires image data in order and performs real-time image processing, so that the instructor image 24 can be shown in the video imagery 22 and plays smoothly, and the user does not experience delay. The first image 23 may also include a first background image (not shown in FIGS. 3 and 4) as the background of the instructor image 24, such as a real background of the coach performing a demonstration exercise or a virtual background constructed by image processing. The background color usually is black or a single color to support the instructor image 24, with the background formed as a rectangle superimposed on the second image 25. If the instructor image 24 shown in the video imagery 22 is processed by "image matting", that is, when the first image 23 does not have the first background image, the instructor image 24 is displayed as a human figure and is directly overlapped on the second image 25. The first image 23 may also include images formed of symbols such as motion prompt trajectory and motion evaluation to guide the user to move correctly (Please refer to the applicant's Chinese Patent Application No. 202010836985.7 or U.S. Ser. No. 17/394,408 Patent application).

The control unit 80 controls the display device 20 to display the instructor image 24 and the speaker device 30 to play the instructor voice corresponding to the instructor image 24 at the same time. The instructor voice may be an explanations of movement actions, reminder to pay attention, counting of repetitive actions, motivational words to users, etc. In general, if the instructor image 24 comes from a real person (e.g. coach) image in a pre-recorded video or a real-time video, the control unit 80 will simultaneously control the speaker device 30 to play the instructor voice to guide the user in performing the fitness exercise. The instructor voice may be a live recording, dubbing or artificial voice.

The second image 25 includes a user image 26 from a real-time image of the user being presented in a mirror image on the display device 20, so the user can check his or her current posture. For example, when the user stands in front of the screen 21 and raises his or her right hand, the capture device 60 captures a front image of the user raising the right hand, and the control unit 80 will instantly reverses the real-time image of the user in the horizontal direction and control the display device 20 to display the user image 26 in the video imagery 22. In this scenario, the user image 26 in the video imagery 22 appears in the display as the user raising the left hand. When the user is facing the user image 26 in the video imagery 22, it appears as if that they are facing themselves in a mirror. In other words, the control unit 80 controls the position and size of the user image 26 in the video imagery 22, so that the user sees the user image 26 similar to seeing the mirror image of the user through a mirror. Using different optical imaging methods, the original data of the real-time image captured by the camera 60 (for example, the data that can form an image on an imaging device such as CCD or CMOS) may be a reversed mirror image in the horizontal direction of the actual scene, so that the control unit 80 does not need to perform the mirroring processing to obtain the user image 26, because the image data from the optical device is already reversed. In practice, the user image 26 may not show an image of the whole body of the user. For example, the user image 26 may only show the part of the user's body above the calf when the user is standing. The user image 26 showing part of a body may be due to using a smaller display device 20, but it may also be a problem of the position of the user. Preferably, the control unit 80 can use a specific image recognition technology to determine the position of the user relative to the capture device 60 from the real-time image of the user and request the user to move forward, backward, left or right with visual messages and/or voice messages if necessary to get a better user image 26.

Assuming the user's intuition causes them to follow the instructor image 24 of the fitness exercises, the instructor image 24 displayed in the video imagery 22 usually presents a whole body front posture, and the user facing the video imagery 22 may position themselves relative to the exercise instruction apparatus 1 such at the user will stand so that they and the instructor image 24 are positioned face-to-face. That is, if the instructor image 24 raises the left hand, this will induce the user to raise their right hand. The instructor image 24 is face-to-face with the user, and the user may model their behavior based on what they are seeing in front of them. Therefore, the user can see the instructor image 24 modeling a particular posture, and the user can correct his or her posture by comparing any differences. Of course, when the instructor image 24 demonstrates the fitness exercises for users to follow, it may not always present a whole body positive posture because of the movement and the parts of the demonstration.

The second image 25 may also include a second background image 27 (not shown in FIGS. 3 and 4; but shown in schematically in FIG. 9A to 9C) as the background of the user image 26, where the second background 27 is usually the real background of the user's fitness exercise site. That is, when the capture device 60 captures the real-time image of the user, the second background image 27 is the actual scene around the user. If the second image 25 uses the real background as the background of the user image 26, the second background image 27 will also be a reversed mirror image in the horizontal direction of the actual scene. That is, control unit 80 will take the real-time image (cutting out the required rectangular area and performing mirroring processing if necessary) captured by the capture device 60 as the second image 25 shown in the video imagery 22, and wherein the second image 25 includes the user image 26 reflecting the user and second background image 27 reflecting the ambient brightness. Moreover, the control unit 80 can appropriately control the position and size of the second image 25 in the video imagery 22, so that the user facing the screen 21 will see the second image 25 which will simulate seeing a mirror image of himself or herself and the surroundings through a mirror. The control unit 80 may perform image processing such as softening, lightening, or blurring on the second background image 27 in the second image 25 to highlight the user image 26 located in the central area. If the user image 26 shown in the video imagery 22 is processed "removing background", such that the second image 25 does not have the second background image 27, the user image 26 is directly displayed on the background color (which may be black or colorless or some other background) in the video imagery 22.

Preferably, the position and size of the first image 23 and the second image 25 in the video imagery 22 can be selected or adjusted by the user according to personal preference. In practice, the user may use the portable device 92 to send corresponding signals to the communication device 50 (as a command receiving interface), or use buttons, touch, voice control, or gesture control to issue related commands. The control unit 80 will switch or adjust the position or size of at least one of the first image 23 and the second image 25 to respond to the commands. For example, the user can select a layout similar to the video imagery 22 shown in FIG. 3, which shows an instructor image 24 (representing the first image 23 from FIG. 4) and the user image 26 (representing the second image 25 from FIG. 4) displayed in the center and occupying most of the area of the video imagery 22. The size of the user image 26 is controlled to resemble a mirror image in a real mirror, and the size of the instructor image 24 substantially matches the user image 26 or is slightly smaller, with the instructor image 24 overlapping the user image 26 in a semi-transparent manner. Alternatively, the user can select a layout similar to the video imagery 22 shown in FIG. 8A where the selected one of the instructor image 24 (representing the first image 23) and the user image 26 (representing the second image 25) is located in the central area and occupies most of the area of the video imagery 22, and the unselected one is displayed in a specific or selected corner in a significantly smaller size. The overlap area of the instructor image 24 and the user image 26 is small and the two images are misaligned with each other.

When guiding the user to perform the fitness exercise, the video imagery not only shows the first image 23 and the second image 25, but also shows some auxiliary information about the progress of the exercise course, for example, the name of the current exercise section 28 and/or the remaining time of the exercise section 29, etc. The auxiliary information may be displayed separately from the first image 23 and the second image 25, or may be overlapped on the images in a transparent or opaque manner. For example, the auxiliary information may be superimposed on the second background image 27 occupying the entire video imagery 22. Alternatively, the auxiliary information may be part of the first image 23, so that all display content in the video imagery 22 except for the second image 25 is part of the first image 23.

Figure 5E:
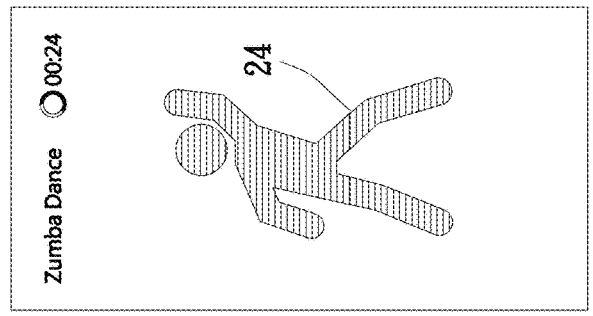
FIGS. 5A-5E illustrate an example of the displayed content of FIG. 3 in different stages of image processing for adjusting transparency of the first image and the second image in a trade-off relationship.
Figure 5D:
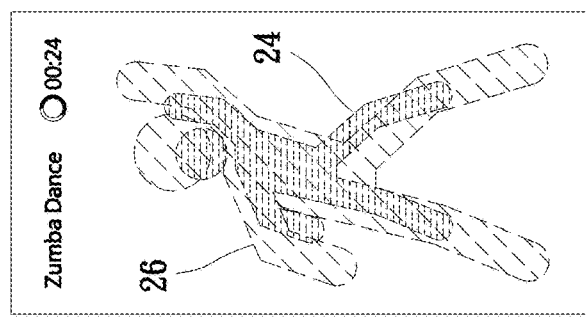
Figure 5C:
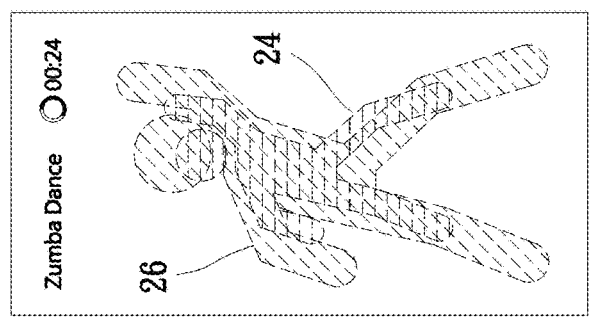
Figure 5B:
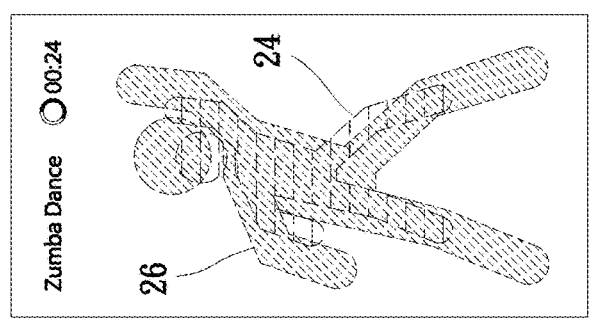
Figure 5A:
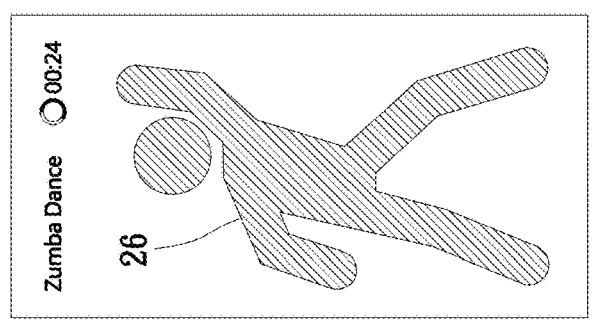

Referring to FIGS. 5A to 5E, the transparency of the instructor image 24 (representing the first image 23) and the user image 26 (representing the second image 25) in the video imagery 22 can be set by the user according to personal needs, one of the images is relatively opaque, visible and obvious and the other is relatively transparent and unobvious or even invisible. A typical usage situation is shown in FIG. 5C, where the transparency of the instructor image 24 and the user image 26 are both 50% (note: It is assumed that the user image 26 is displayed on the background color of the video imagery with 50% transparency, and the instructor image 24 is overlapped on the user image 26 with 50% transparency). In general, the user can sees the instructor image 24 and the user image 26 well at the same time. If the user wants to see the instructor image 24 more clearly, the user can decrease the transparency of the instructor image 24 appropriately, for example, the transparency of the instructor image 24 is decreased from 50% to 25%, and the transparency of the user image 26 will be correspondingly increased at the same time, for example, from the 50% to 75%, so the visibility of the user image 26 is relatively degraded and the visibility of the instructor image 24 is relatively improved (as shown in FIG. 5D). In contrast, if the user wants to see the user image more clearly, the user can decrease the transparency of the user image 26 appropriately, for example, from 50% to 25%, and the transparency of the instructor image 24 will be correspondingly increased at the same time, for example, from the 50% to 75%, so that the visibility of the user image 26 is relatively improved, and the visibility of the instructor image 24 is relatively degraded (as shown in FIG. 5B). The user may also adjust the transparency of the user image 26 to the highest 100%, which is completely transparent (invisible), and in the meanwhile, the transparency of the instructor image 24 will be adjusted to the lowest 0%, which is completely opaque, so that the user can only see the instructor image 24 (as shown in FIG. 5E). Similarly, the user may also adjust the transparency of the instructor image 24 to the highest 100%, which is completely transparent (invisible), and in the meanwhile, the transparency of the user image 26 will be adjusted to the lowest 0%, which is completely opaque, so that the user can only see the user image 26 (as shown in FIG. 5A). Regardless of the transparency settings, the speaker device 30 will continue to play the instructor voice, even if the instructor image 24 in the video imagery 22 is less obvious or even invisible, and the user can still follow the instructor voice to perform fitness exercises, which is "audio coaching" similar to exercising in front of a mirror while listening to a radio or podcast program.

FIGS. 5A to 5E illustrate that the transparency of the instructor image 24 and the user image 26 can be adjusted in five stages from completely opaque to completely transparent; that is, the respective transparency may be 0%, 25%, 50%, 75% or 100% and the adjusting step is 25%. Of course, the transparency may be adjusted more finely depending on the user preference, for example, using steps of 10%, 5%, or 1% to increase or decrease the transparency at each stage.

In the above adjustment, the transparency of the instructor image 24 (representing the first image 23) and the user image 26 (representing the second image 25) are adjusted in a trade-off relationship. That is, the decrease in transparency occurs in conjunction with the increase in the transparency of the other. In this situation, the user image 26 becomes more transparent when the transparency of the instructor image 24 is decreased, and vice versa. In practice, the user only needs to issue a command to increase or decrease the transparency of one of the first image 23 and the second image 25, and the control unit 80 will increase or decrease the transparency of the selected image in response to the command, and the transparency of the other image will be decreased or increased simultaneously.

Figure 6C:
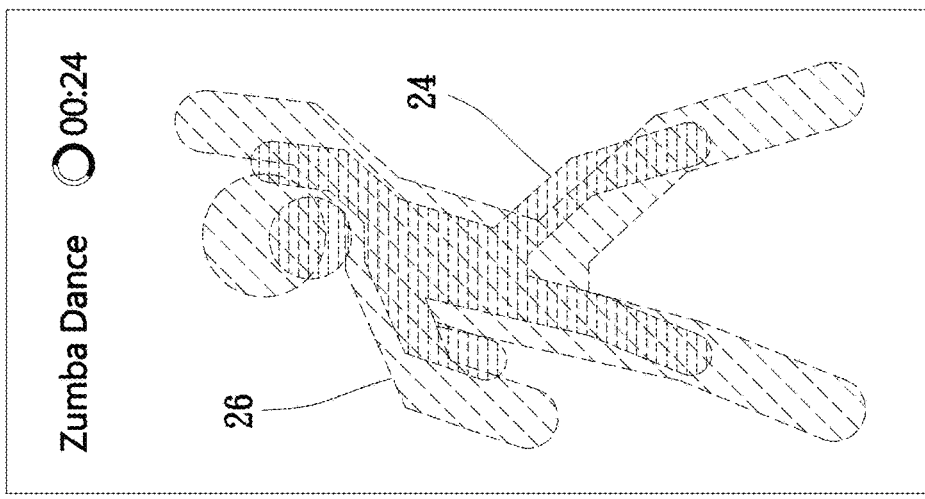
FIGS. 6A-6C illustrate an example of the displayed content of FIG. 3 in different stages of image processing for adjusting transparency of the first image only.
Figure 6B:
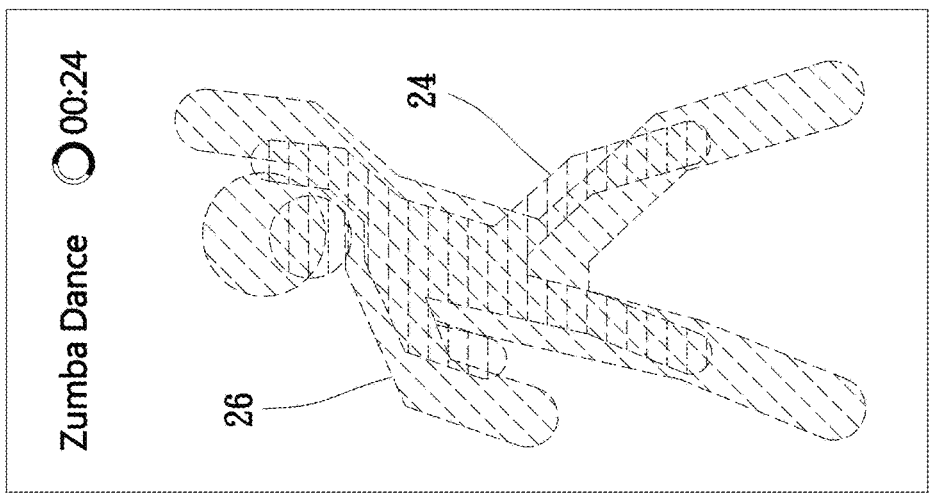
Figure 6A:
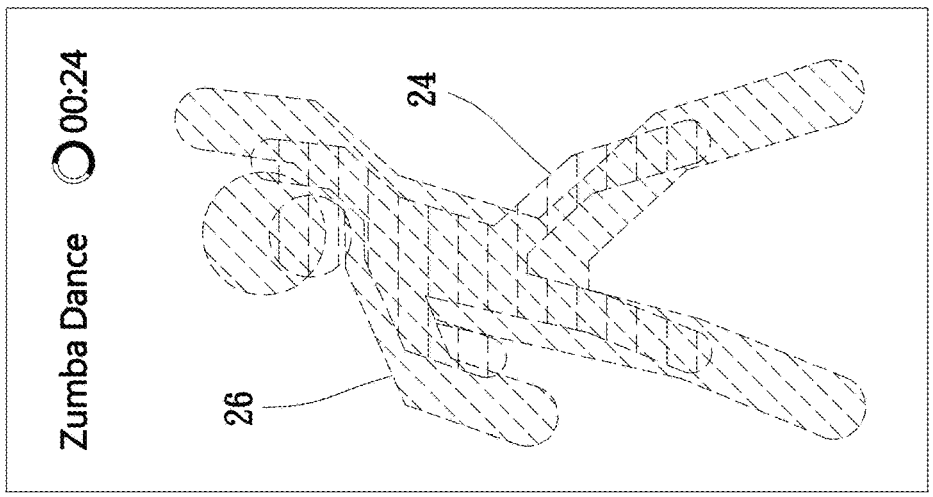

As shown in FIGS. 6A to 6C, the exercise instruction apparatus 1 of the preferred embodiment may also provide an adjustment method allowing the user to independently adjust the transparency of the instructor image 24 (representing the first image 23) without changing the transparency of the user image 26 (representing the first image 25). For example, the transparency of the instructor image 24 in FIGS. 6A, 6B, and 6C is 75%, 50%, and 25% respectively, but the transparency of the user image 26 remains at 50%.

Figure 7C:
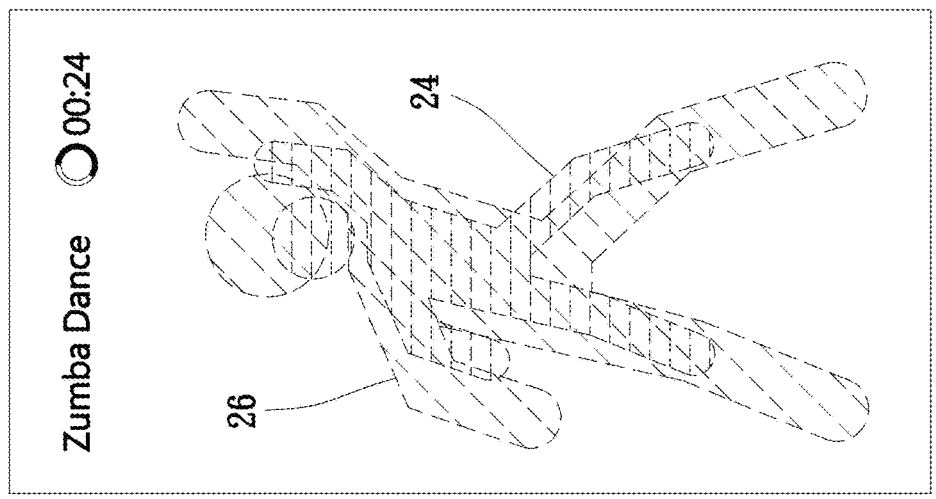
FIGS. 7A-7C illustrate an example of the display content of FIG. 3 in different stages of image processing for adjusting transparency of the second image only.
Figure 7B:
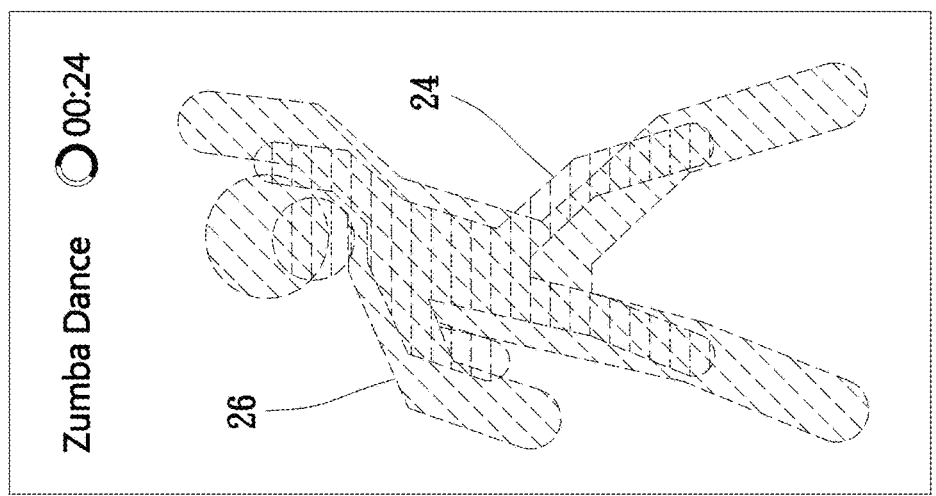
Figure 7A:
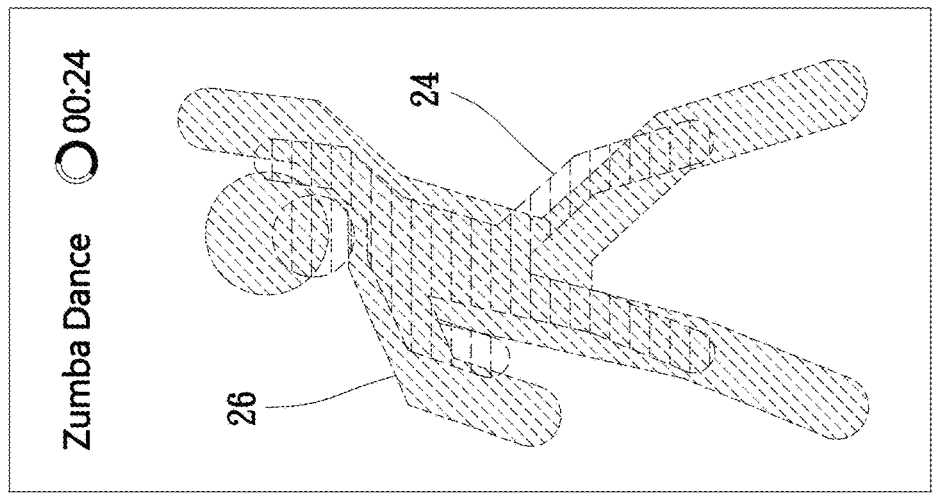

Similarly, as shown in FIGS. 7A to 7C, the exercise instruction apparatus 1 of the preferred embodiment may also provide an adjustment method allowing the user independently adjust the transparency of the user image 26 (representing the first image 25) without changing the transparency of the instructor image 24 (representing the first image 23). For example, the transparency of the user image 26 in FIGS. 7A, 7B, and 7C is 25%, 50%, and 75%, respectively, but the transparency of the instructor image 24 remains at 50%.

Figure 8A:
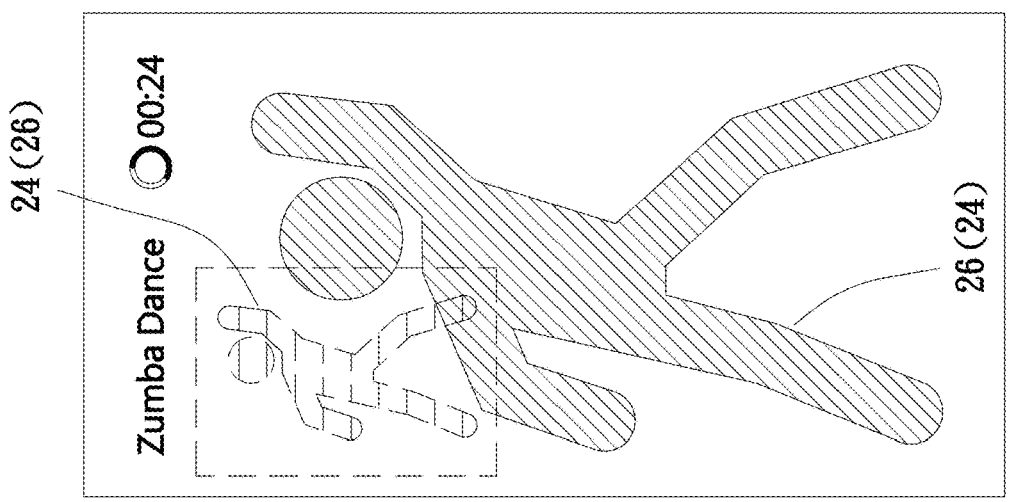
FIGS. 8A-8C illustrate an example of the display content of another embodiment of the present disclosure in different stages of image processing for adjusting transparency of the first image and the second image in a trade-off relationship.
Figure 8B:
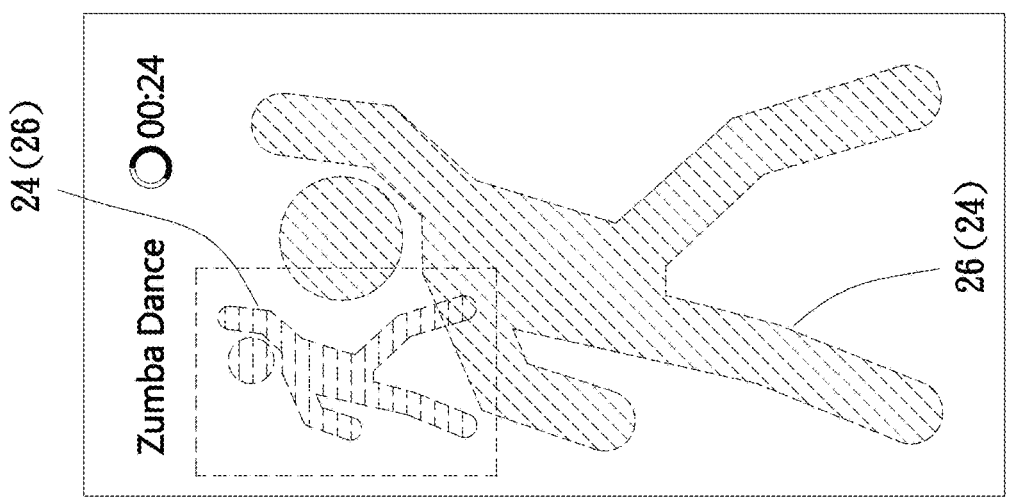
Figure 8C:
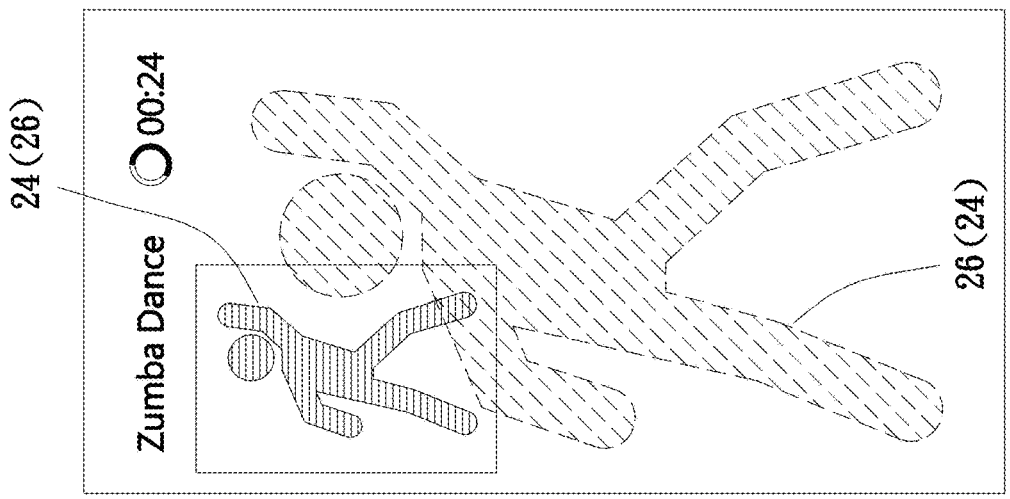

Referring to FIGS. 8A to 8C, the typical image layout may be shown in FIG. 8B, where the transparency of the user image 26 which is located in the central area and the transparency of the instructor image 24 which is located in the corner area are about 30% and 60% respectively. It is assumed in this scenario that the user image 26 located in the central area has a transparency of about 30%, shown by video imagery 22, and the instructor image 24 located in the corner area has a transparency of about 60% shown by user image 26. As shown in FIG. 8A, when the transparency of the user image 26 is adjusted to the lowest 0%, which is completely opaque relative to the background color, the instructor image 24 still maintains the visibility to some extent, for example, a transparency of about 80%. Referring to FIG. 8C, when the transparency of the instructor image 24 is adjusted to a preset lowest threshold of about 20%, the user image 26 is still visible with a transparency of about 45%. Although the transparency of the instructor image 24 and the user image 26 are adjusted in trade-off relationship, the increase or decrease of transparency of both images is a non-linear relationship or a scaled inverse relationship.

In practice, when the ambient brightness around exercise instruction apparatus 1 becomes brighter, the user image 26 and the second background image 27 in the video imagery 22 may be made brighter or more opaque to increase visibility. In contrast, when the ambient brightness around the exercise instruction apparatus 1 becomes darker, the user image 26 and the second background image 27 in the video imagery 22 may be dimmer or more transparent. The user can adjust the transparency of at least one of the first image 23 and the second image 25 according to the ambient brightness, so that the visibility relationship between the first image 23 and the second image 25 is adjusted to suit a personal preference. For example, under a reference or standard ambient brightness, the user may feel that the transparency of the first image 23 and the second image 25 being about 50% is the best contrast relationship of visibility. When the ambient brightness becomes brighter, the user may slightly decrease the transparency of the first image 23 to about 45% or 40%, and/or slightly increase the transparency of the second image 25 to about 55% or 60%, so as to make the first image 23 more obvious and the second image 25 less obvious. The object would be to correct the contrast imbalance due to the second image 25 becoming brighter as the ambient brightness increases. Of course, the contrast correction described above can be done, done a different way, or not done at all based on the preferences of the user.

The preferred embodiment of the exercise instruction apparatus 1 may also include an automatic adjusting mode. When the ambient brightness around exercise instruction apparatus 1 becomes brighter, the control unit 80 performs the image processing of decreasing the transparency of the first image 23 and increasing the transparency of the second image 25, so that the visibility of the first image 23 is relatively improved and the visibility of the second image 25 (which becomes brighter as the ambient light becomes brighter) is relatively degraded. In contrast, when the ambient brightness around the exercise instruction apparatus 1 becomes darker, the control unit 80 performs the image processing of increasing the transparency of the first image 23 and decreasing the transparency of the second image 25, so that the visibility of the first image 23 is relatively degraded and the visibility of the second image 25 which becomes darker as the ambient light becomes darker is relatively improved. The control unit 80 determines the ambient brightness around the exercise instruction apparatus 1 according to the illuminance detected by the ambient light detector 70. In another embodiment, the control unit 80 determines the ambient brightness around the exercise instruction apparatus 1 according to the brightness of the real-time images captured by capture device 60. In a further embodiment, the control unit 80 may also perform comprehensive adjustments based on both the illuminance and the brightness of the real-time images.

In addition to adjusting the transparency of the first image 23 and the second image 25 to change the contrast relationship, the visibility may also be adjusted by changing the image brightness, transparency, contrast, sharpness, hue, luminance, chroma, gain, gamma, color temperature and color balance. The improvement of visibility of one of the first image 23 and the second image 25 in the video imagery 22 makes the image more obvious. Taking FIGS. 6A to 6C as an example, increasing the image brightness, contrast, sharpness, luminance, and/or chroma of the instructor image 24 (where one or more of these image parameters is shown increasing from FIG. 6A to FIG. 6B to FIG. 6C) makes the instructor image 24 more obvious than the user image 26. In contrast, decreasing the image parameters mentioned above could make the instructor image 24 less obvious or less visible. The brightness of the image may be adjusted by changing the color of corresponding pixels, such as by changing the luminous intensities of red, green and blue sub-pixels, rather than by adjusting the luminance of the backlight module of the display device 20.

Based on the user's personal preference and ambient brightness, the control unit 80 performs image processing on the content of the video imagery 22 to adjust the image parameters to improve visibility and contrast. The control unit 80 may automatically perform image processing according to the ambient brightness, the purpose of which is to keep a contrast relationship of visibility consistent between the first image 23 and the second image 25 in the video imagery 22, or at least to keep the visibility of the images when the ambient brightness changes. When the ambient brightness becomes brighter, the contrast relationship between the first image 23 and the second image 25 is changed because of the visibility of the second image 25 improvement, so the control unit 80 adjusts one of the image parameters of one of the first image 23 and the second image 25 to improve the visibility of the first image 23 and degrade the visibility of the second image 25. In contrast, when the ambient brightness becomes darker, the contrast relationship between the first image 23 and the second image 25 is changed because of the visibility of the second image 25 degraded, so the control unit 80 adjusts one of the image parameters of one of the first image 23 and the second image 25 to degrade the visibility of the first image 23 and improve the visibility of the second image 25. The image parameter that is adjusted for the first image 23 may be a different parameter than the image parameter that is adjusted for the second image 25.

Figure 9C:
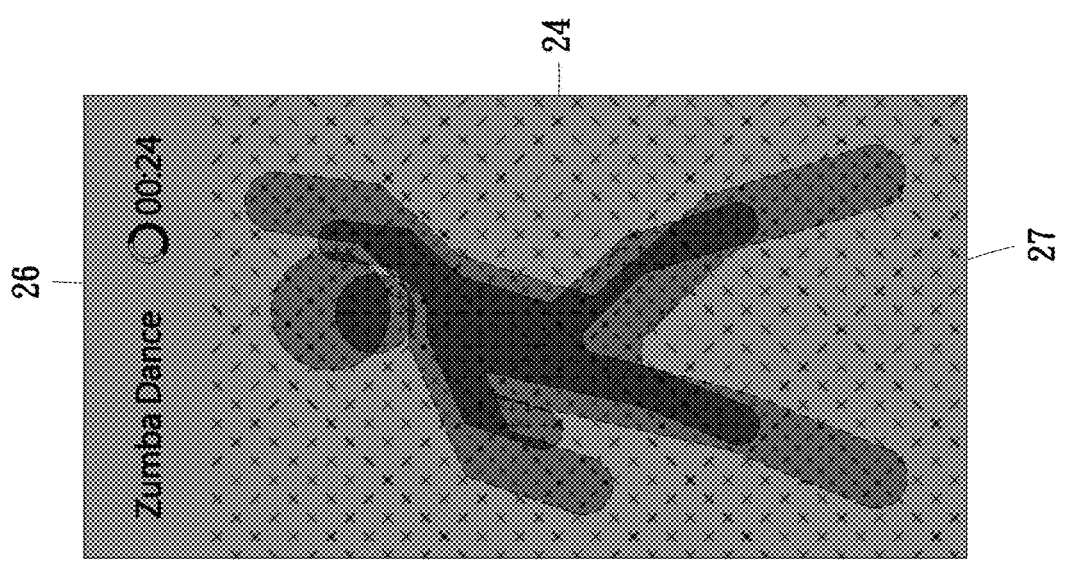
FIGS. 9A-9C illustrate an example of the display content of FIG. 3 in different stages of image processing for adjusting the brightness of the first image and the second image respectively.
Figure 9B:
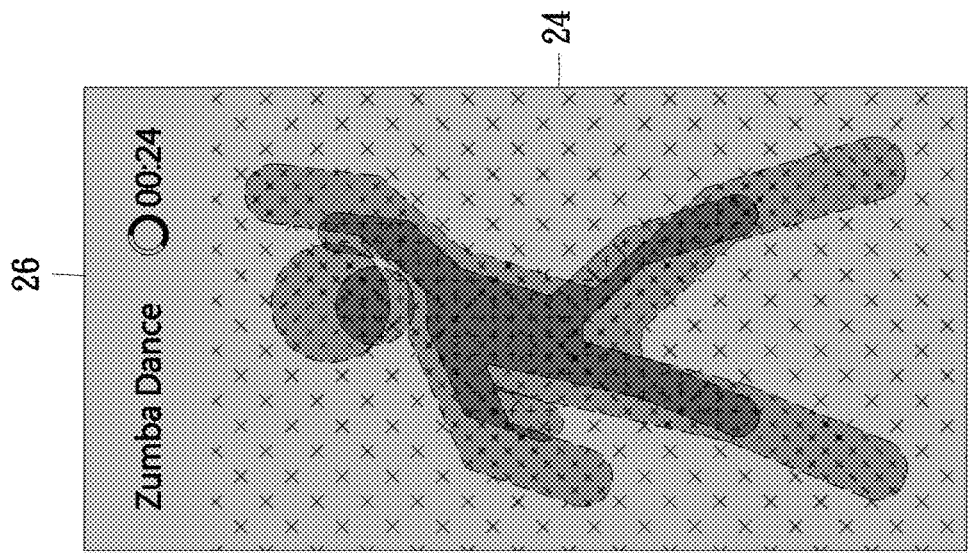
Figure 9A:
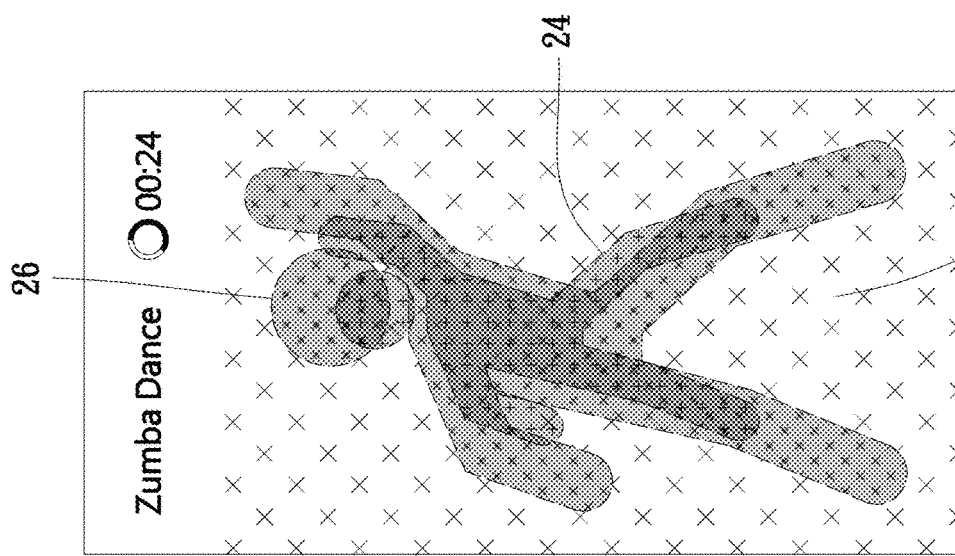

FIGS. 9A to 9C illustrate changing the brightness of the video imagery 22 under different ambient brightness. Under a reference or standard ambient brightness, as shown in FIG. 9B, the brightness of the video imagery 22 has a suitable amount of contrast and brightness to allow a user to view the first image 23 and the second image 25. Different contrast levels may be preset, automatically adjusted, or manually adjusted by the user to make the contrast relationship between the first image 23 and the second image 25 meet the personal preferences of the user in different ambient lighting. When the ambient brightness becomes brighter (such as a room exposed to direct sunlight), as shown in FIG. 9A, the brightness of the first image 23 and second image 25 in the video imagery 22 are increased to improve the visibility. When the ambient brightness becomes darker (such as a dimly lit or dark room), as shown in FIG. 9C, the brightness of the first image and the second image in the video imagery 22 are decreased to reduce eyestrain.

Figure 10C:
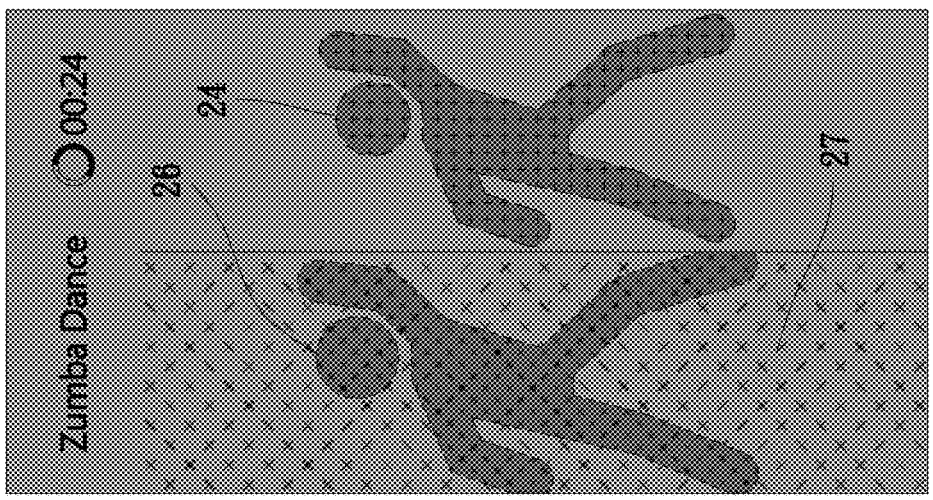
FIGS. 10A-10C illustrate an example of the display content of another embodiment of the present disclosure in different stages of image processing for adjusting the brightness of the first image and the second image respectively.
Figure 10B:
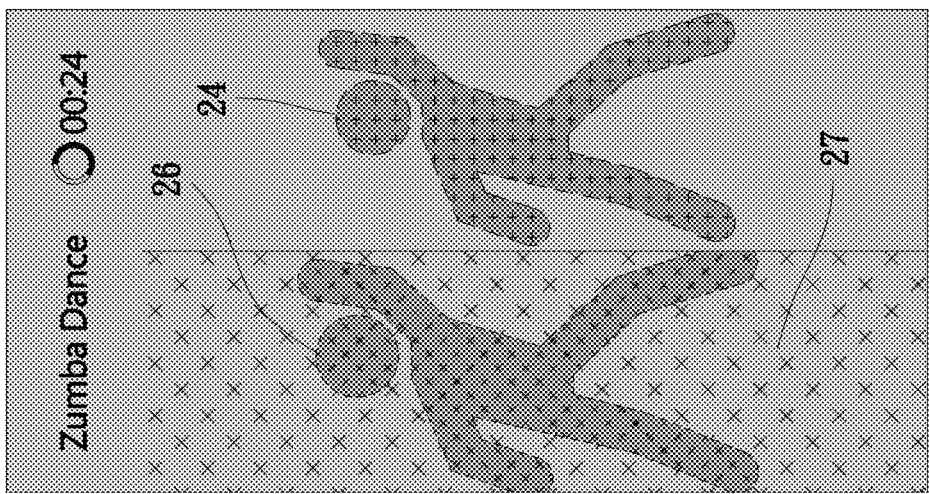
Figure 10A:
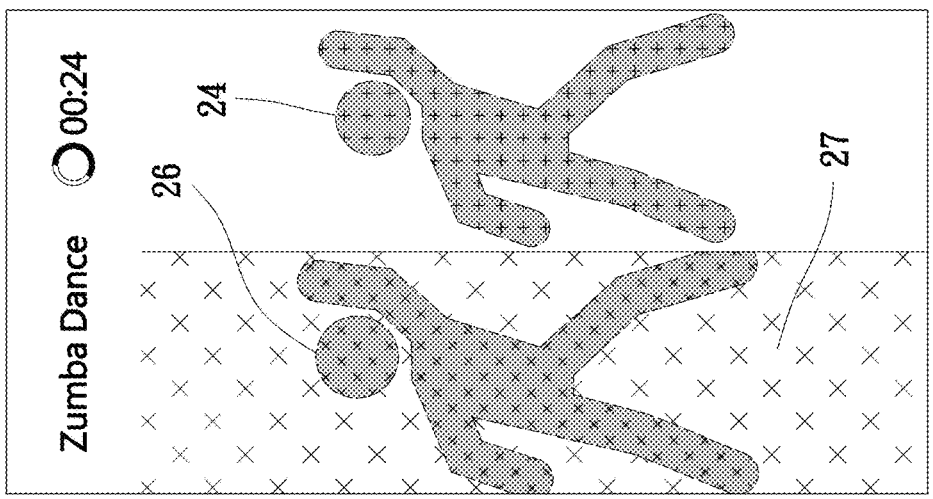

FIG. 10A to 10C illustrate the brightness changing of the video imagery 22 under different ambient brightness with a different video imagery layout. The first image 23, showing the instructor image 24, is shown in the right half of the video imagery 22 and the second image 25, showing the user image 26 and the second background image 27 is shown in the left half of the video imagery 22. In this visual configuration, the first image 23 and the second image 25 are not overlapped.

Referring to FIGS. 9A to 9C and to FIGS. 10A to 10C, the control unit 80 adjusts the brightness of the first image 23 and the second image 25 according to the ambient brightness and in response to user commands. The control unit 80 may automatically adjust the brightness of the images in response to the commands to increase or decrease the brightness of the video imagery 22. The brightness of the first image 23 and the second image 25 may be adjusted simultaneously and by increasing the first image 23 by the same level that the second image 25 is being decreased. Alternatively, the brightness levels can be adjusted at different times, or the brightness levels can be adjusted by different amounts. In the preferred embodiment, the contrast relationship of visibility between the first image 23 and the second image 25 can be maintained so that the user won't feel one of the first image 23 and the second image 25 becomes relatively brighter or relatively darker.

FIG. 11 illustrates a difference of image processing according to the ambient brightness between the present invention and other methods. Each row represents a different brightness adjustment of the image processing on the video imagery 22 according to the ambient brightness respectively. The brightness contrast between the first image 23 (shown as the instructor image 24 in FIG. 11) and the second image 25 (shown as the user image 26 in FIG. 11) in the video imagery 22 is shown in each block. The first row shows the control unit 80 does not adjust the brightness of the video imagery 22 according to the ambient brightness. The second row shows the control unit 80 adjusts the brightness of the entire video imagery 22 according to the ambient brightness. The third row shows that the control unit 80 adjusts the brightness of the first image 23 and the second image 25 in the video imagery 22 respectively according to the ambient brightness. The three situations are further explained as follows.

As shown in the first row of FIG. 11, the control unit 80 does not perform image processing on the content of the video imagery 22 according to the ambient brightness. The brightness contrast between the instructor image 24 (representing the first image 23) and the user image 26 (representing the second image 25) will be different under different ambient brightness. This is because the user image 26 is from a real-time image captured by the capture device 60. The user image 26 will become brighter when the ambient light turns brighter and will become darker when the ambient light turns darker. The instructor image 24 may be a pre-recoded image or a remote real-time image, so the brightness of the instructor image 24 is not affected by the of the user's ambient brightness. Assuming that the exercise instruction apparatus 1 is under a reference or standard ambient brightness (as shown in the middle block in each row of FIG. 11), the brightness contrast between the user image 26 and the instructor image 24 of the video imagery 22 is naturally balanced in terms of brightness. Therefore, in the middle column of each row of FIG. 11, the brightness contrast is shown as 100:100. Higher value of contrast (for example, 200:100) means the image is brighter and lower value of contrast (for example, 50:100) means the image is darker. The equivalent value of the contrast here (as shown by a contrast of 100:100) means the brightness of the instructor image 24 and the user image 26 is the same. When the ambient brightness becomes brighter (as shown in the left block in each row of FIG. 11), the user image 26 becomes brighter and the brightness of the instructor image 24 doesn't change. That causes the brightness contrast between the two images to be in an imbalance (e.g., the contrast is changed from 100:100 to 200:100, and the user image becomes relatively brighter and the instructor image becomes relatively darker). Similarly, when the ambient brightness becomes darker (as shown in the right block in each row of FIG. 11), the user image 26 becomes darker and the instructor image 24 remains unchanged. That causes the brightness contrast between the two images to be in an imbalance (e.g., the contrast is changed from 100:100 to 50:100, and the user image becomes relatively darker and the instructor image becomes relatively brighter). Another problem is that if the brightness of the image is not adjusted according to ambient brightness, the brightness of the video imagery 22 when preset to a single level of brightness may be a poor brightness level in a bright environment or an excessive brightness level in a dark environment.

As shown in the second row of FIG. 11, assuming that a screen brightness automatic adjustment method commonly available in smart phones or tablet computers is directly used, when the ambient brightness becomes brighter or darker, the control unit 80 would automatically increases or decreases the brightness of the video imagery 22 according to the preset setting (for example, adjust the luminance of the backlight module of the display device 20). This method can improve the visibility of the video imagery 22 in a brighter environment and reduce eyestrain in a darker environment. However, under different ambient brightness, the brightness contrast between the instructor image 24 (representing the first image 23) and the user image 26 (representing the second image 25) of the video imagery 22 will be different. Stating this a different way, because the environment itself is brighter or darker, the user image 26, recorded in this environment, is also respectively brighter or darker than the more constant brightness of the instructor image 24. When the ambient brightness becomes brighter and the control unit 80 hasn't yet adjusted the brightness of the video imagery 22, the brightness contrast between the two images is in an imbalance and the user image becomes relatively brighter. The contrast is changed solely from the lighting change in the environment from 100:100 to a contrasting brightness, such as 200:100. If the video imagery 22 were to increase the brightness of the overall display to make the video imagery 22 more visible in this brighter environment, this would brighten both images. In this example, this could increase the brightness of the user image 26 and the instructor image 24 by the same magnification, e.g., from 200:100 to 400:200. Therefore, the brightness contrast between the two images is still in an imbalance, which means the user image 26 becomes relatively brighter and the instructor image 24 becomes relatively darker.

The reverse would also be true. When the ambient brightness becomes darker and the control unit 80 hasn't yet adjusted the brightness of the video imagery 22, the brightness contrast between the two images is in an imbalance and the user image becomes relatively darker. The contrast is changed solely from the lighting change in the environment from 100:100 to a contrasting brightness, such as 50:100. If the video imagery 22 were to decrease the brightness of the overall display to make the video imagery 22 more easily seen in this darker environment, this would darken both images. In this example, this could decrease the brightness of the user image 26 and the instructor image 24 by the same magnification, e.g., from 50:100 to 25:50. Therefore, the brightness contrast between the two images is still in an imbalance, which means the user image 26 becomes relatively darker and the instructor image 24 becomes relatively brighter.

The third row of FIG. 11 is an operation mode of the exercise instruction apparatus 1 of the preferred embodiment. The control unit 80 respectively adjusts the brightness of the first image 23 and the second image 25 of the video imagery 22 according to the reference or standard ambient brightness. When the exercise instruction apparatus 1 is under different ambient brightness, the brightness contrast between the instructor image 24 (representing the first image 23) and the user image 26 (representing the second image 25) remains the same or substantially unchanged. When the exercise instruction apparatus 1 is under a reference or standard ambient brightness, the brightness contrast between the user image 26 and the instructor image 24 of the video imagery 22 is in a balance (e.g. 100:100). When the ambient brightness becomes brighter and the control unit 80 hasn't yet adjusted the brightness of the video imagery 22, the brightness contrast between the two images becomes 200:100. The control unit 80 increases the brightness of the user image 26 and the instructor image 24 respectively according to the preset setting, and the increase in the brightness of the instructor image 24 is greater than the increase in the brightness of the user image 26. In this example, the brightness contrast between the user image 26 and the instructor image 24 is changed from 200:100 to 220:220 so the brightness contrast between the user image 26 and the instructor image 24 of the video imagery 22 maintains in balance. When the ambient brightness becomes brighter, the brightness of the first image 23 and the second image 25 are also both brighter than the reference or standard ambient brightness, and the visibility of the video imagery can be maintained. The brightness contrast between the first image 23 and the second image 25 is maintained in a balance that the user prefers under various ambient brightness.

Similarly, when the ambient brightness becomes darker, the control unit 80 decreases the brightness of the user image 26 and the instructor image 24 respectively. The decrease in the brightness of the instructor image 24 is greater than the decrease in the brightness of the user image 26. In this example, the brightness contrast between the user image 26 and the instructor image 24 is changed from 50:100 to 45:45 so that the brightness contrast between the user image 26 and the instructor image 24 of the video imagery 22 maintains in a balance. When the ambient brightness becomes darker, the brightness of the first image 23 and the second image 25 are also both darker than the reference or standard ambient brightness to make the user seeing more comfortable. The brightness contrast between the first image 23 and the second image 25 is maintained in a balance that the user prefers under various ambient brightness.

In another embodiment of brightness adjustment, when the ambient brightness becomes brighter, the brightness contrast between the user image 26 and the instructor image 24 becomes 200:100, and the control unit 80 only increases the brightness of the first image 23 (representing the instructor image 24) to make the brightness contrast becomes 200:200, so that the brightness contrast between the user image 26 and the instructor image 24 is maintained in balance. Similarly, when the ambient brightness becomes darker, the brightness contrast between user image 26 and the instructor image 24 becomes 50:100, and the control unit 80 only decreases the brightness of the first image 23 (representing the instructor image 24) to make the brightness contrast becomes 50:50, so that the brightness contrast between the user image 26 and the instructor image 24 is maintained in balance.

The brightness contrast of all the blocks in FIG. 11 represent the brightness of the image displayed by the display device 20, rather than the brightness perceived by the user's eyes. The user seeing an image of a set brightness in a darker environment sees that image of set brightness as being brighter than seeing the same image in a brighter environment. When the brightness contrast between the user image 26 and the instructor image 24 is the same in any environment, the user feels the brightness of the two images are the same resulting in a brightness balance. And when the brightness contrast between the user image 26 and the instructor image 24 is different in any environment, the user feels the brightness of the two images are different resulting in a brightness imbalance.

FIG. 11 illustrates an example of the brightness contrast between the user image 26 (as shown in the left half of each block) and the instructor image 24 (as shown in the right half of each block) in a block form. However, the two images can also be shown as separated human figure similar to FIG. 10A to 10C, as separated human figure similar to FIG. 8A to 8C and may also be shown as overlapped human figure in a semi-transparent manner similar to FIG. 9A to 9C.

The "real-time" mentioned in this preferred embodiment is substantially in real-time. Capturing, processing and displaying of the user image 26 does take some amount of time, though with fast processing speeds, the user basically does not feel any significant delay between the user image 26 in the video imagery 22 and the real movements of the user. Moreover, even if a single frame of the video imagery 22 occasionally exceeds a preferred maximum time delay (for example, 1/60 of a second) in image processing and displaying, it only causes a temporary delay of the video imagery 22, which is acceptable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An exercise instruction apparatus for guiding a user to perform a fitness exercise, comprising:
   an instruction data acquiring device configured to acquire an instructor image for demonstrating movements of the fitness exercise;
   a capture device configured to capture a real-time image of the user;
   a display device configured to display video imagery on a screen; and
   a control unit, electrically connected to the instruction data acquiring device, the capture device, and the display device, the control unit configured to receive corresponding data of the instructor image obtained by the instruction data acquiring device and to receive the real-time image of the user from the capture device, and to control content of the video imagery displayed by the display device, wherein the control unit is operable to perform corresponding image processing on the content of the video imagery according to an ambient brightness around the exercise instruction apparatus; and wherein the image processing includes adjusting at least one image parameter of at least one of a first image and a second image.

2. The exercise instruction apparatus as claimed in claim 1, wherein the control unit is operable to control the instructor image shown in the video imagery when guiding the user to perform the fitness excise.

3. The exercise instruction apparatus as claimed in claim 1, wherein the control unit is operable to control the video imagery to show the first image and the second image simultaneously.

4. The exercise instruction apparatus as claimed in claim 1, wherein the control unit is operable to control the video imagery to show the first image and the second image simultaneously, wherein the first image comprises the instructor image and the second image comprises a user image from the real-time image captured by capture device and being presented as a mirror image of the user.

5. The exercise instruction apparatus as claimed in claim 1, wherein the control unit is operable to control the video imagery to show the first image and the second image simultaneously, wherein the second image comprises a user image from the real-time image captured by capture device, and wherein the user image is presented as a mirror image of the user.

6. The exercise instruction apparatus as claimed in claim 1, wherein the image parameter includes at least one of following parameters: brightness, transparency, contrast, sharpness, hue, luminance, chroma, gain, gamma, color temperature and color balance.

7. The exercise instruction apparatus as claimed in claim 1, wherein the control unit is operable to control position and size of the user image in the video imagery whereby the user seeing the user image is similar to seeing the mirror image of the user through the mirror.

8. The exercise instruction apparatus as claimed in claim 1, further comprising a command receiving interface for receiving a command from the user, wherein the control unit is electrically connected to the command receiving interface for responding to the command for respectively adjusting the image parameter, position or size of at least one of the first image and the second image.

9. The exercise instruction apparatus as claimed in claim 1, wherein the first image and the second image at least partially overlap, and an overlapped part shows the first image and the second image at the same time in a semi-transparent manner.

10. The exercise instruction apparatus as claimed in claim 9, further comprising a command receiving interface for receiving a command from the user, wherein the control unit is electrically connected to the command receiving interface for responding to the command to adjust transparency of at least one of the first image and the second image.

11. The exercise instruction apparatus as claimed in claim 10, wherein the transparency of the first image and the second image are adjustable in at least five stages from completely transparent to completely opaque; wherein a decrease in the transparency of one of the first image and the second image occurs in conjunction with an increase in the transparency of the other, whereby when one of the first image and the second image is completely opaque, the other is completely transparent.

12. The exercise instruction apparatus as claimed in claim 1, further comprising a speaker device, and the control unit being operable to control a voice content emitted by the speaker device to include an instructor voice matching to the instructor image.

13. The exercise instruction apparatus as claimed in claim 9, wherein when the ambient brightness around exercise instruction apparatus becomes brighter, the control unit performs the image processing of decreasing the transparency of the first image and increasing the transparency of the second image, and wherein when the ambient brightness around the exercise instruction apparatus becomes darker, the control unit performs the image processing of increasing the transparency of the first image and decreasing the transparency of the second image.

14. The exercise instruction apparatus as claimed in claim 1, wherein when the ambient brightness around the exercise instruction apparatus becomes brighter, the control unit performs the image processing of increasing brightness of at least the first image of the first image and the second image, and an increase in the brightness of the first image is greater than an increase in the brightness of the second image; and wherein when the ambient brightness around the exercise instruction apparatus becomes darker, the control unit performs the image processing of decreasing the brightness of at least the first image of the first image and the second image, and a decrease in the brightness of the first image is greater than the a decrease in the brightness of second image.

15. The exercise instruction apparatus as claimed in claim 9, wherein when the ambient brightness around the exercise instruction apparatus becomes brighter, the control unit performs the image processing of increasing brightness of at least the first image of the first image and the second image, and an increase in the brightness of the first image is greater than an increase in the brightness of the second image; and wherein when the ambient brightness around the exercise instruction apparatus becomes darker, the control unit performs the image processing of decreasing the brightness of at least the first image of the first image and the second image, and a decrease in the brightness of the first image is greater than the a decrease in the brightness of second image.

16. The exercise instruction apparatus as claimed in claim 1, further comprising an ambient light detector to detect an illuminance of an environment, wherein the control unit is electrically connected to the ambient light detector for receiving corresponding signal of the illuminance detected by the ambient light detector and configured to determine the ambient brightness around the exercise instruction apparatus according to the illuminance.

17. The exercise instruction apparatus as claimed in claim 1, wherein the control device is operable to determine of the ambient brightness around the exercise instruction apparatus according to brightness of the real-time image.

* * * * *